United States Patent
Li et al.

(10) Patent No.: US 8,488,244 B1
(45) Date of Patent: Jul. 16, 2013

(54) ULTRA COMPACT OPTICAL MULTIPLEXER OR DEMULTIPLEXER

(75) Inventors: Yao Li, Newark, CA (US); Xuan Wang, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 133 days.

(21) Appl. No.: 13/030,076

(22) Filed: Feb. 17, 2011

Related U.S. Application Data (60) Provisional application No. 61/399,367, filed on Jul. 12, 2010.

(51) Int. Cl.
*G02B 27/10* (2006.01)
*H04J 14/02* (2006.01)

(52) U.S. Cl.
USPC ............ 359/618; 359/619; 359/641; 398/79; 385/24

(58) Field of Classification Search
USPC ...... 359/618, 619, 625, 626, 641; 385/14–18, 385/24; 398/82, 83, 89; 250/208.1, 214.1, 250/216
See application file for complete search history.

(56) References Cited

U.S. PATENT DOCUMENTS

| | | | |
|---|---|---|---|
| 5,071,225 A * | 12/1991 | Inoue | 359/634 |
| 5,583,683 A * | 12/1996 | Scobey | 398/79 |
| 5,818,627 A * | 10/1998 | Perlo et al. | 359/292 |
| 5,894,535 A * | 4/1999 | Lemoff et al. | 385/47 |
| 5,933,238 A * | 8/1999 | Ikuta et al. | 356/364 |
| 6,636,654 B2 * | 10/2003 | McGuire, Jr. | 385/17 |
| 7,177,493 B2 * | 2/2007 | McGuire, Jr. | 385/16 |
| 7,548,313 B2 * | 6/2009 | Nguyen | 356/328 |
| 7,674,999 B2 * | 3/2010 | Jennings et al. | 219/121.65 |

* cited by examiner

*Primary Examiner* — Loha Ben
(74) *Attorney, Agent, or Firm* — Joe Zheng; Wuxi Sino IP Agency, Ltd.

(57) ABSTRACT

Designs of optical devices providing multiplexing or demultiplexing functions are disclosed. According to one embodiment, an optical device or an assembly employs an array of micro lenses, an array of filters and a glass block all bonded onto a substrate to provide multiplexing or demultiplexing functions. To compensate for possible errors caused by some or all of these components, one or more compensatory optical plates are provided to respectively correct these errors. Depending on implementation, the compensatory optical plates may be designed differently to correct various errors.

16 Claims, 9 Drawing Sheets

FIG. 1

Prior Art

ULTRA COMPACT OPTICAL MULTIPLEXER OR DEMULTIPLEXER

CROSS-REFERENCE TO RELATED APPLICATION

This application claims the benefits of the provisional application, No. 61/399,367, entitled "ULTRA-COMPACT MUX/DEMUX", filed on Jul. 12, 2010, now abandoned, which is hereby incorporated by reference for all purposes.

BACKGROUND OF THE INVENTION

1. Field of the Invention

The invention is generally related to the area of optical communications. In particular, the invention is related to optical devices, modules or assemblies to process light beams and the making thereof. The optical devices modules or assemblies include, but may not be limited to, multiplexing devices and adding/dropping devices.

2. The Background of Related Art

The communication networks continue to demand increasingly bandwidths and flexibility to different communication protocols. Fiber optic networks are becoming popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, separate wavelengths or channels of data can be multiplexed into a light stream transmitted on a single optical fiber. To take the benefits and advantages offered by the WDM system, there require many sophisticated optical network elements.

Optical add/drop devices are those elements often used in optical systems and networks. For example, an exchanging of data signals involves the exchanging of matching wavelengths from two different sources within an optical network. In other words, the multi-channel signal would drop a wavelength while simultaneously adding a channel with a matching wavelength at the same network node.

From a terminology viewpoint, a device that multiplexes different wavelength channels or groups of channels into one fiber is a multiplexer, and a device that divides the multiplexed channels or groups of channels into individual or subgroups of channels is a demultiplexer. Specifically, a multiplexer combines several channels of optical signals into a single signal, or in reverse a demultiplexer separates a single multichannel signal into several individual channel signals, such multiplexer or demultiplexer is referred to a multiplexing or demultiplexing module, or simply multiplexer or demultiplexer.

Multiplexers/De-multiplexers (Mux/DeMux) are needed in optical modules such as quad small-form-factor pluggable (QSFP). The QSFP is a full-duplex optical module with four independent transmit and receive channels. It is designed to replace four single-channel small-form-factor pluggable (SFP) and in a package only about 30% larger than the standard SFP. To equip such an QSFP, the size of a Mux/DeMux module into a QSFP, the size of the module is very important. Accordingly, there is a great need for such optical modules being made small, and at the same time, the modules so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for dropping a selected wavelength or a group of wavelengths as well as demultiplexing a multiplexed signal into several signals. The same devices can also perform adding or multiplexing functions. For simplicity, a selected wavelength or a band signal will be deemed or described as a channel hereinafter. According to one aspect of the present invention, an optical device or an assembly employs an array of micro-lenses, an array of filters and a glass block all bonded onto a substrate to provide multiplexing or demultiplexing functions. To compensate for possible errors caused by some or all of these components, one or more compensatory optical plates are provided to respectively correct these errors. Depending on implementation, the compensatory optical plates may be designed differently to correct various errors.

The optical devices so designed in accordance with the present invention are amenable to small footprint, enhanced impact performance, lower cost, and easier manufacturing process. Various embodiments of the present invention may be used in many areas such as optical communications and devices and may be implemented in many ways as a subsystem, a device or a method. According to one embodiment, the present invention is an optical apparatus comprising a collimator, a glass block coated with a first coating and a second coating on one side, an array of filters affixed to another side of the glass block, each of the filters passing through one specified wavelength, an array of micro-lenses, the glass block, the filters and the micro-lenses, and a substrate on which the collimator, glass block and micro-lenses are bonded, where the glass block is tilted with respect to the collimator and the array of micro-lenses to ensure that each of the micro-lenses corresponds to one of the filters. Depending on implementation, one or more compensative plates may be inserted between the array of filters and the array of micro-lenses to correct optical errors introduced by one or more of these components.

Many objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

According to one embodiment of the present invention, designs of optical devices providing multiplexing or demultiplexing functions are disclosed. These devices are also referred to as ultra-compact WDM filters or assemblies. The size of the devices is small enough to fit many small form-factor optical modules such as Quad Small Form-factor Pluggable (QSFP) optical module for telecommunications or data communication equipment. The QSFP modules are the next generation of pluggable modules intended for high density applications. It is designed to replace the industry standard four single-channel Small Form-factor Pluggable (SFP) devices. According to one embodiment, such a QSFP module can support data rates up to 10 Gbits/sec like its single-channel counterpart. With four channels each running at 10 Gb/sec, the QSFP is the most practical solution for 40 Gb/sec.

Figure 1:
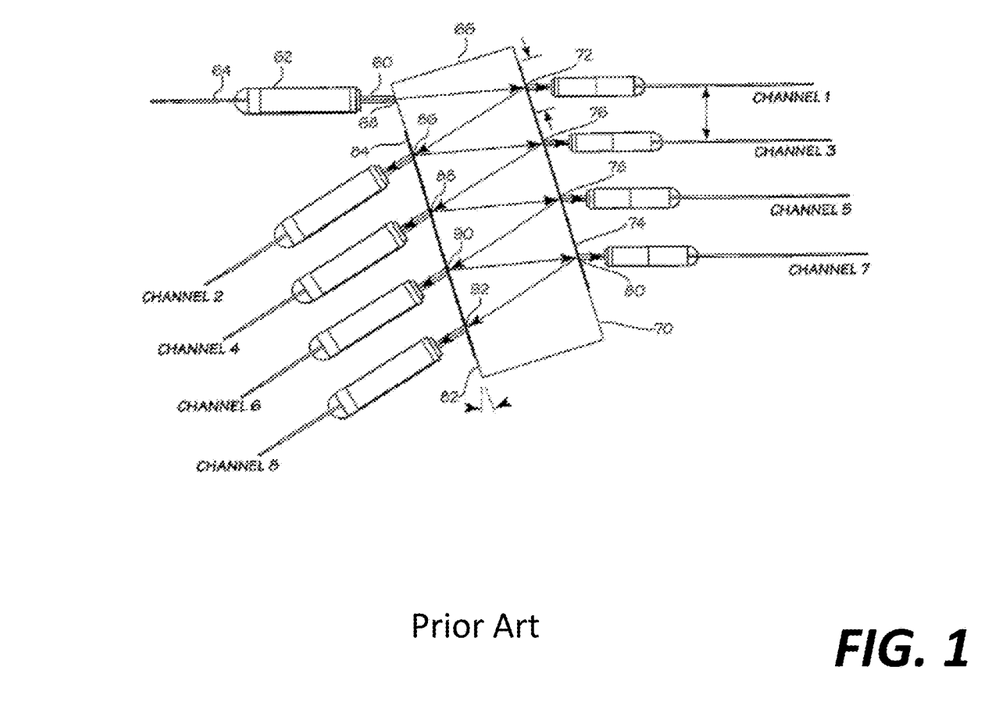
FIG. 1 shows a typical prior art of a multi-port filter (duplicated from U.S. Pat. No. 5,583,683) when used as a de-multiplexer (DeMux)
Figure 2:
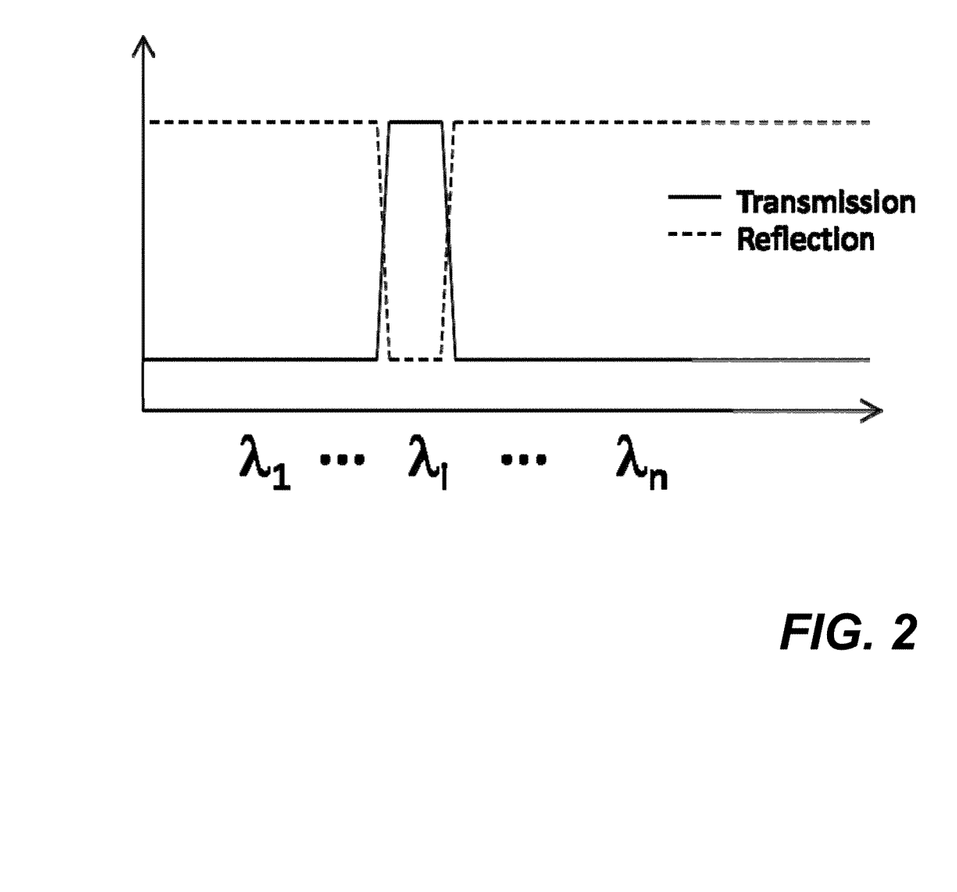
FIG. 2 shows a typical optical transmission and reflection spectrum of a single-channel band-pass filter that transmits a specific wavelength and reflects other wavelengths.

Multiplexers/De-multiplexers (Mux/DeMux) are needed in optical modules such as QSFP as a key part to combine or split 4 signals, each operating at a different wavelengths, into or from a common optical fiber or a common port. FIG. 1 shows a typical prior art of a multi-port filter (U.S. Pat. No. 5,583,683) when used as a de-multiplexer (DeMux). In the device, a multiple wavelength light traveling from a common port is separated into multiple narrow spectral bands directed to individual channels. At each of the multiple ports, a dielectric thin film filter transmits a selected wavelength and reflects all other wavelengths. FIG. 2 shows a typical optical transmission and reflection spectra of a single-channel band-pass filter that transmits a specified wavelength and reflects all wavelengths except for the specified wavelength. The reflected wavelengths (channel signals) continue propagating to a next channel port, where an in-band signal (wavelength) is transmitted through and the other channel signals (wavelengths) are reflected and propagated to subsequent ports. After multiple bounces in a zig-zag fashion, multiple channels are separated or dropped out. The device can also be used as a multiplexer (Mux) with a common port outputting all wavelengths added from the individual channels.

To apply the WDM device of FIG. 1 in a QSFP module, there would be at least two major dimensional challenges: 1) all channel ports of the WDM device of FIG. 1 are located on both sides of the device, which is not suitable for integration in a small form-factor platform; 2) it is difficult to fit 4 channels side by side in a QSFP module due to the limitation of the collimator width and fixtures to bond the collimator on a substrate.

Figure 3:
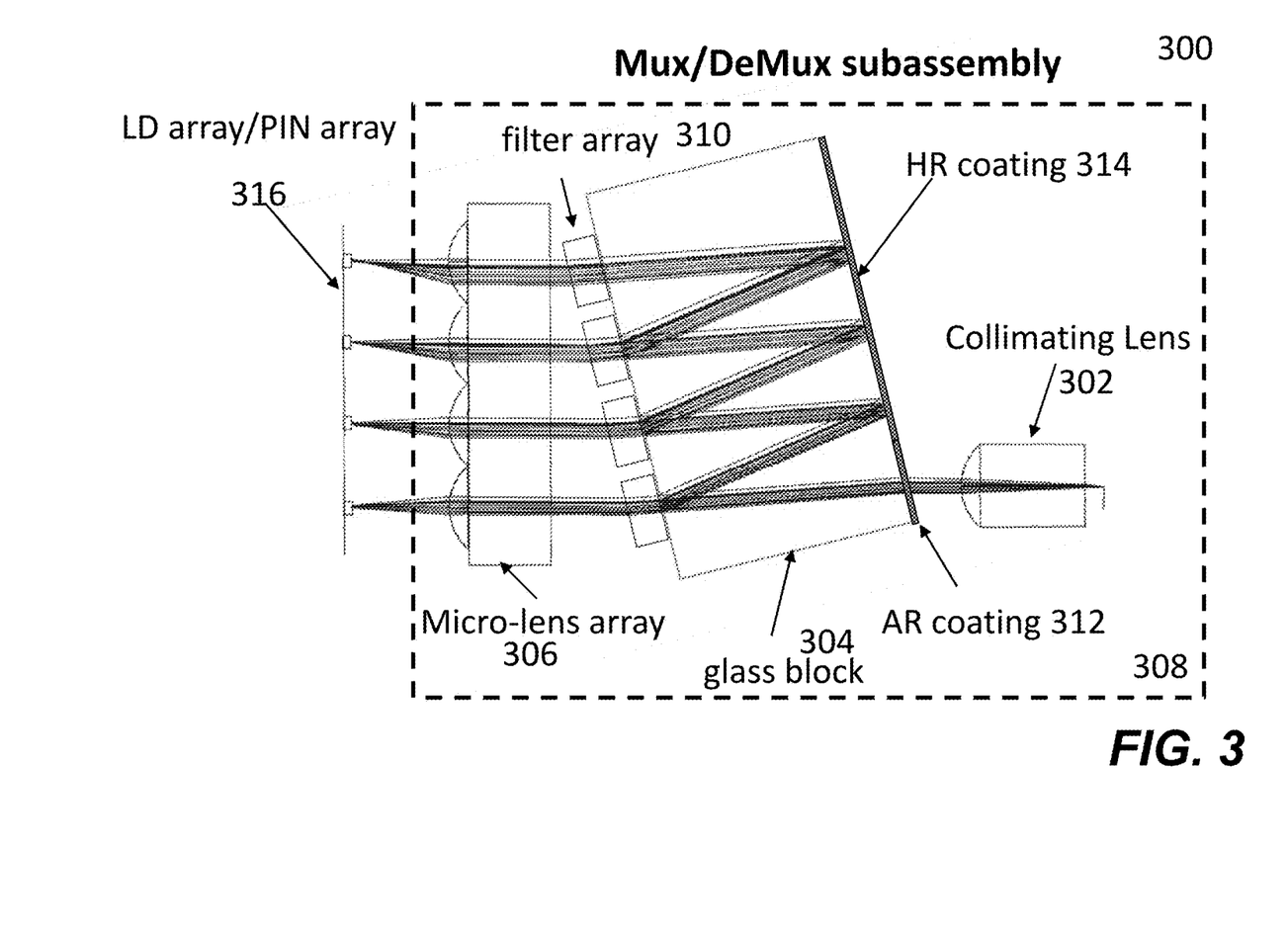
FIG. 3 shows an exemplary configuration of a Mux/DeMux assembly according to one embodiment of the present invention.

FIG. 3 shows an exemplary configuration 300 of a Mux/DeMux assembly according to one embodiment of the present invention. One of the benefits, advantages and objectives of the present invention is to provide such an optical device with the size and functionalities for small form factor modules such as QSFP.

As shown in FIG. 3, all major components such as a collimator 302, a glass block 304 and a micro-lens array 306 are bonded to a substrate 308. As a result, at least two distinctive features are shown in comparison to the prior art: 1) channels on one side of the device are used with filters on the other side replaced by a high-reflectance coating which reflects light with all wavelengths; 2) channel collimators were replaced by a micro-lens array. In this design, a collimated beam bounces twice before reaching the next channel. When using as a DeMux, after passing the filter, the light beam for each channel is then focused by a micro-lens with a receiver located at or around the focal point of the micro-lens. The device can be used as Mux or DeMux with transmitter/receiver array pitch matches with the pitch of the micro-lens. The convex side of micro-lens can face either a filter array or a transmitter/receiver array.

In operation, a light beam is projected into the collimating lens 302. A segment anti-reflective coating 312 on the glass block 304 transmits the light beam through the glass block 304. The light beam hits the filter array 310 that includes four filters, each is made or configured to allow one specified wavelength to pass through and reflects others. A first filter in the filter array 310 allows a wavelength to transmit through. The transmitted wavelength is projected into the micro-lens array 306. A corresponding lens on the micro-lens array 306 couples the transmitted wavelength out to a receiver. Depending on application, an array of electronic devices 316 may be a laser diode (LD), GaAs PIN photodiode or other type of device to receive the transmitted wavelength (signal) or to transmit one or more signals into the assembly 300.

Meanwhile, the first filter in the filter array 310 reflects other wavelengths. The reflected wavelengths transmit in the glass block 304 and hit a high-reflection (HR) coating on the glass block 304 that reflects the reflected wavelengths back to a second filter in the filter array 310. Similar to the first filter, the second filter transmits one wavelength and reflects all others. The transmitted wavelength goes through a corresponding lens on the micro-lens array 306 to couple the transmitted wavelength (signal) out of the assembly 300. The reflected wavelengths from the second filter continue along the remaining filters in the filter array 310 and are eventually separated and coupled out through the lens on the micro-lens array 306.

As the position of each channel is subject to a fixed pitch and cannot be individually adjusted like those in the prior art, the optical performance of the assembly is generally prone to dimensional errors and position errors of the components.

Figure 4:
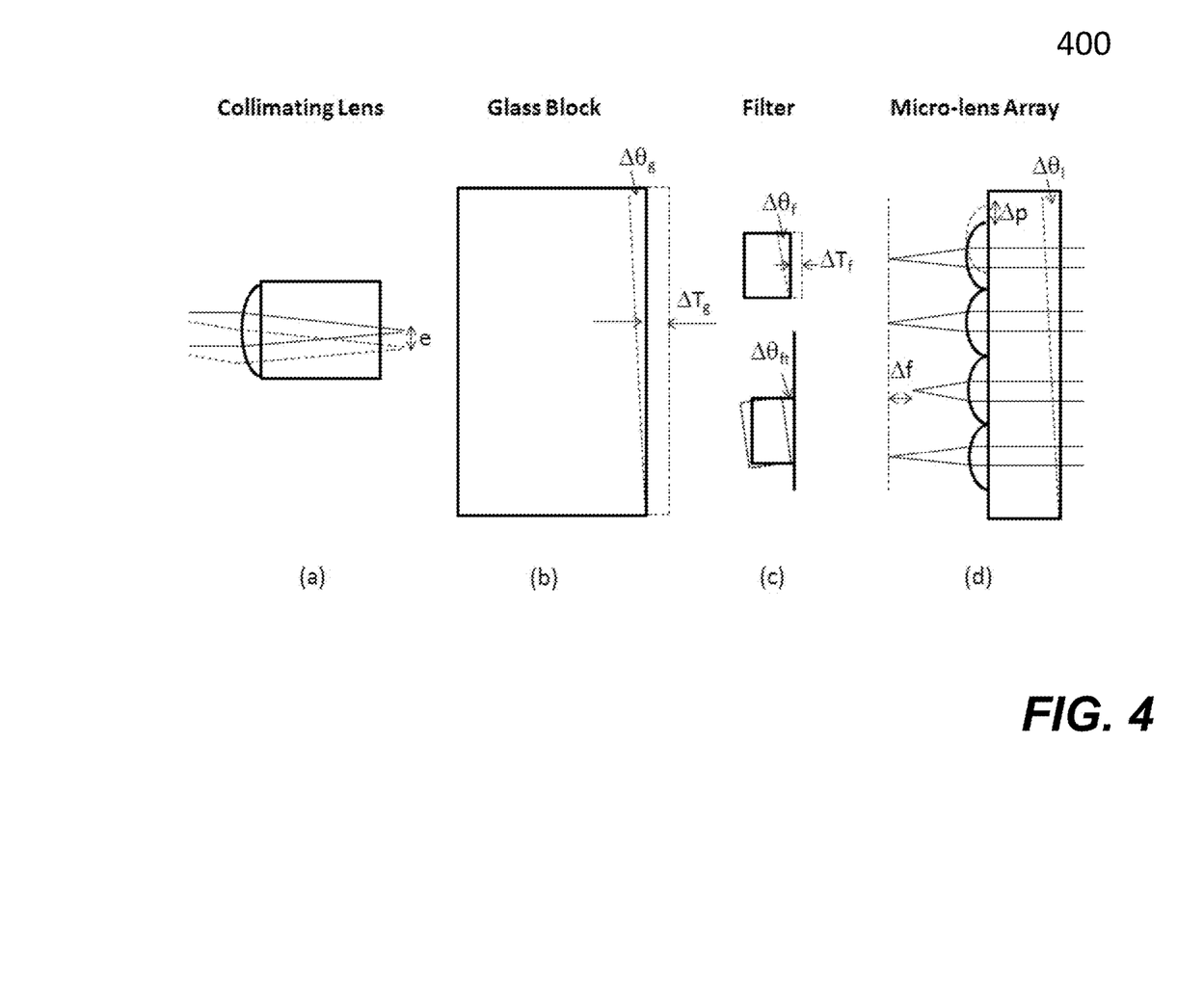
FIG. 4a-FIG. 4d show how each of the major components may create a possible error that eventually affect the performance of the optical device shown in FIG. 3.

Some errors may be compensated or eliminated during the assembling process by adjusting the positions of the components. However, there may be some errors that cannot be compensated and may contribute to degradation of optical performance. FIG. 4 depicts a number of error sources that may degrade optical performance of the assembly. These errors need to be tested and controlled before the assembly process.

Figure 5:
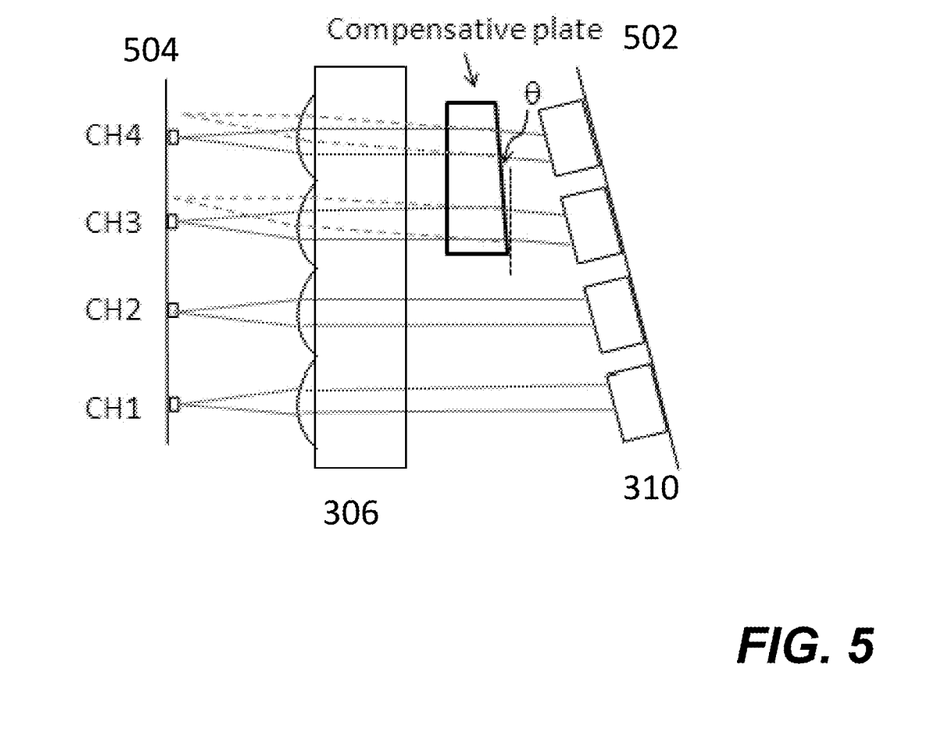
FIG. 5 shows that a compensative plate is inserted in a light path and corrects an angular (rotational) error for CH3 and CH4 as an example.
Figure 6:
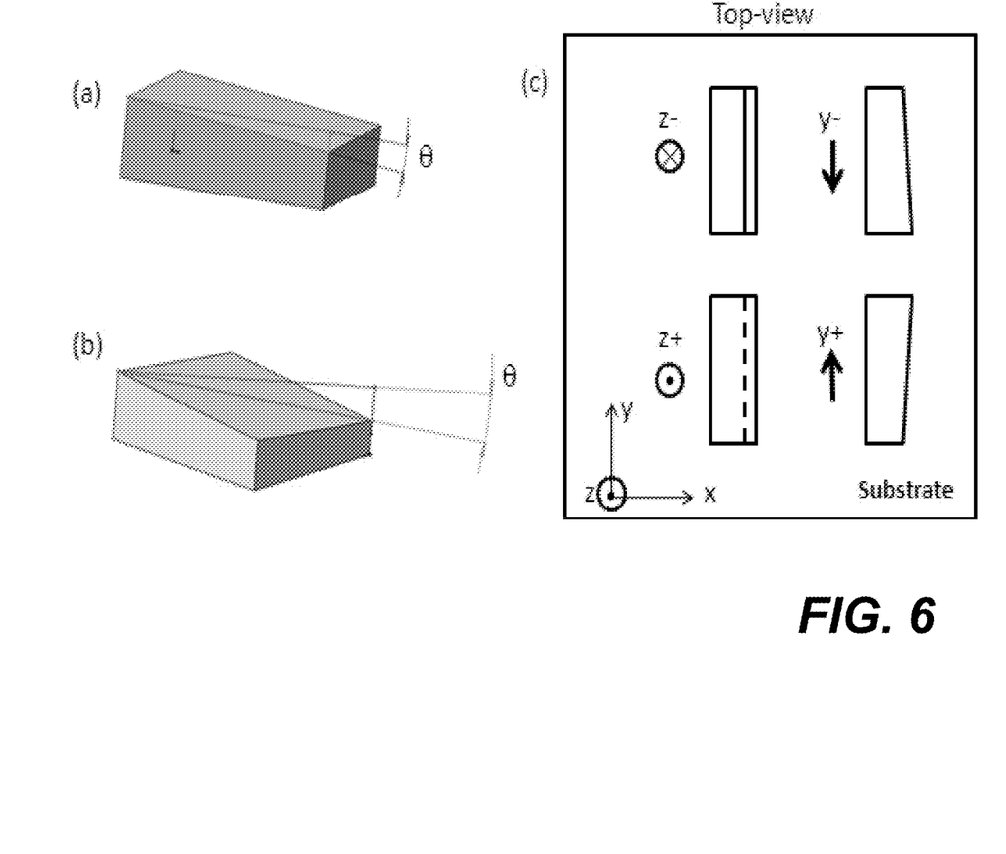
FIG. 6a-FIG. 6c show respectively some exemplary compensative plates with different lengths that may be used to cover 1, 2 or 3 channels in an exemplary module, the compensative plates may be used in 4 different orientations to generate compensative focus offsets at directions shown in FIG. 6(c)

To compensate the residual incident angle error due to the combination effect of all possible error sources, a compensative plate can be inserted between the filter array 310 and the micro-lens array 306. As illustrated in FIG. 5, a compensative plate 502 is inserted on the light path and corrects the angular (i.e., rotational) error for an array 504 of electronic devices of the type of devices 316 of FIG. 3, respectively labeled as CH1, CH2, CH3 and CH4, where only CH3 and CH4 are being corrected. CH3 and CH4 channels are expected to have higher errors due to the accumulating effect of the error sources. An incident angular error will result in misalignment of a focused beam at the output of the assembly and thus causes an extra loss. A number of compensative plates with different cut angles may be prepared to be used during the assembling process according to measured angular errors for specific channel(s). The compensative plates with different lengths may be used to cover 1, 2 or 3 channels. The compensative plates may be used in 4 different orientations to generate compensative focus offsets at directions shown in FIG. 6(c). An alternative compensative plate design is shown in FIG. 6(b) which will generate a focus offset at both y and z directions shown in FIG. 6(c). This compensative plate can also be used at 4 different orientations in a similar fashion.

Figure 7:
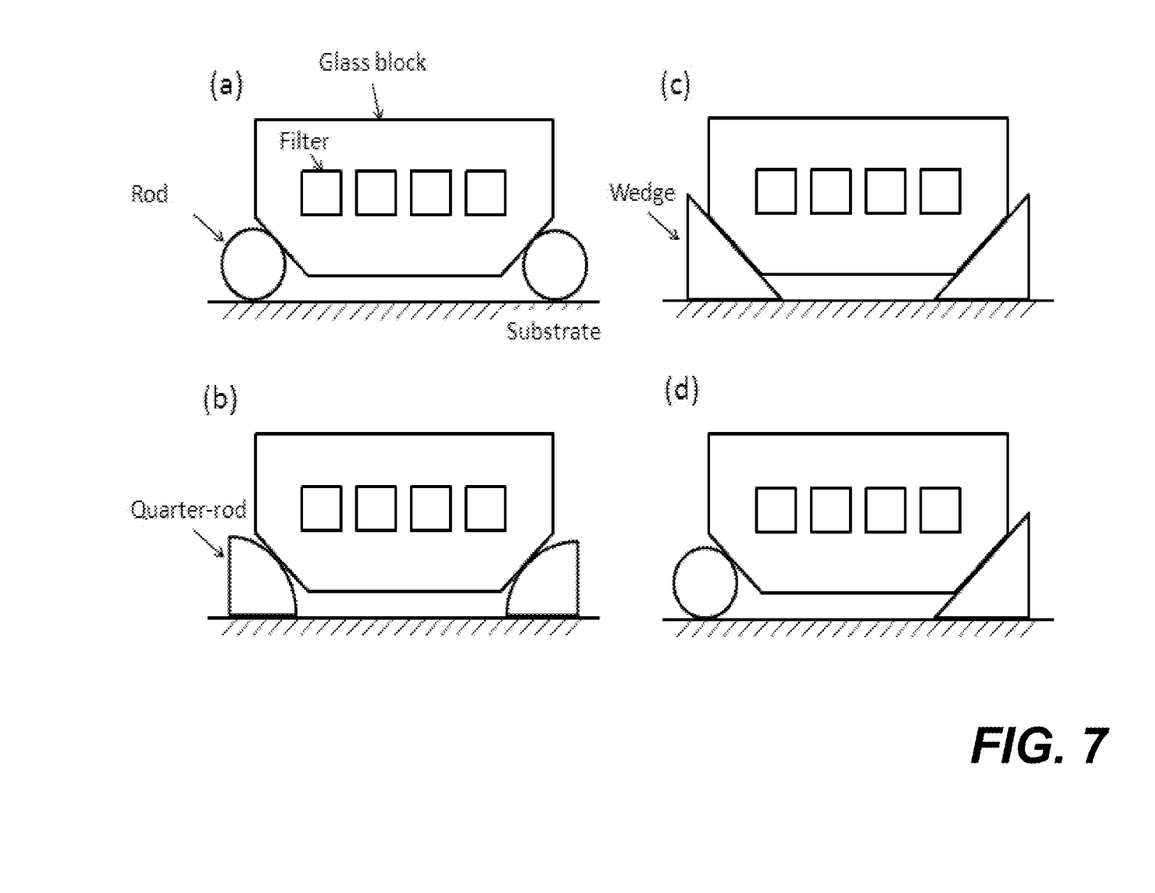
FIG. 7a-FIG. 7d show some typical positioning aids including rods, partial-rods (quarter-rods for example), wedges and their combinations, respectively.

To ensure the position accuracy and reliability while providing sufficient degrees of freedom for positioning, a fixation aid system may be applied. Beveled edges can be created on glass block and a pair of fixation aid block can be used to fix a glass block on the substrate. FIG. 7 shows some typical fixation aid devices including rods, partial-rods (quarter-rods for example), wedges or their combinations. A sample material for the glass block or substrate is usually chosen to match the thermal expansion although other material may be used. During the assembling process, after the position of the glass block is well adjusted by the positioning device, the fixation aid device can be brought into contact with the glass block and substrate and bonded together. After inserting the fixation block, the relative position between the glass block and the substrate should be well defined.

Figure 8:
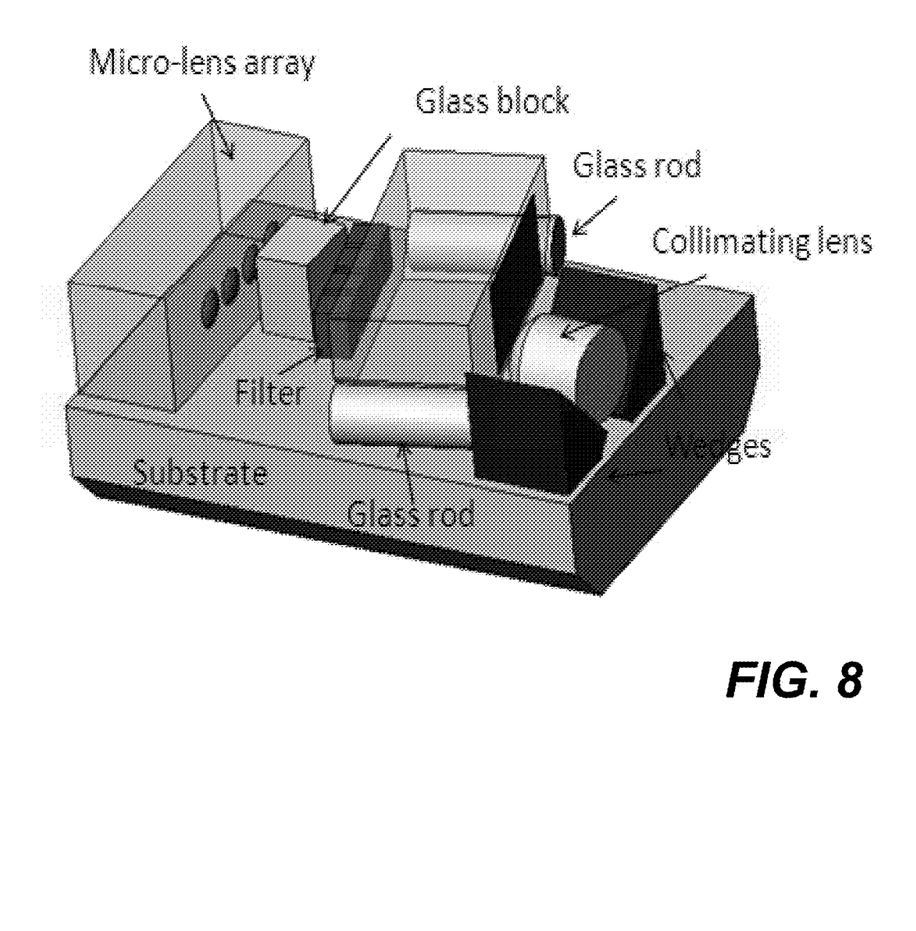
FIG. 8 shows a perspective view of an exemplary assembly with a compensative plate and some positioning aids.
Figure 9:
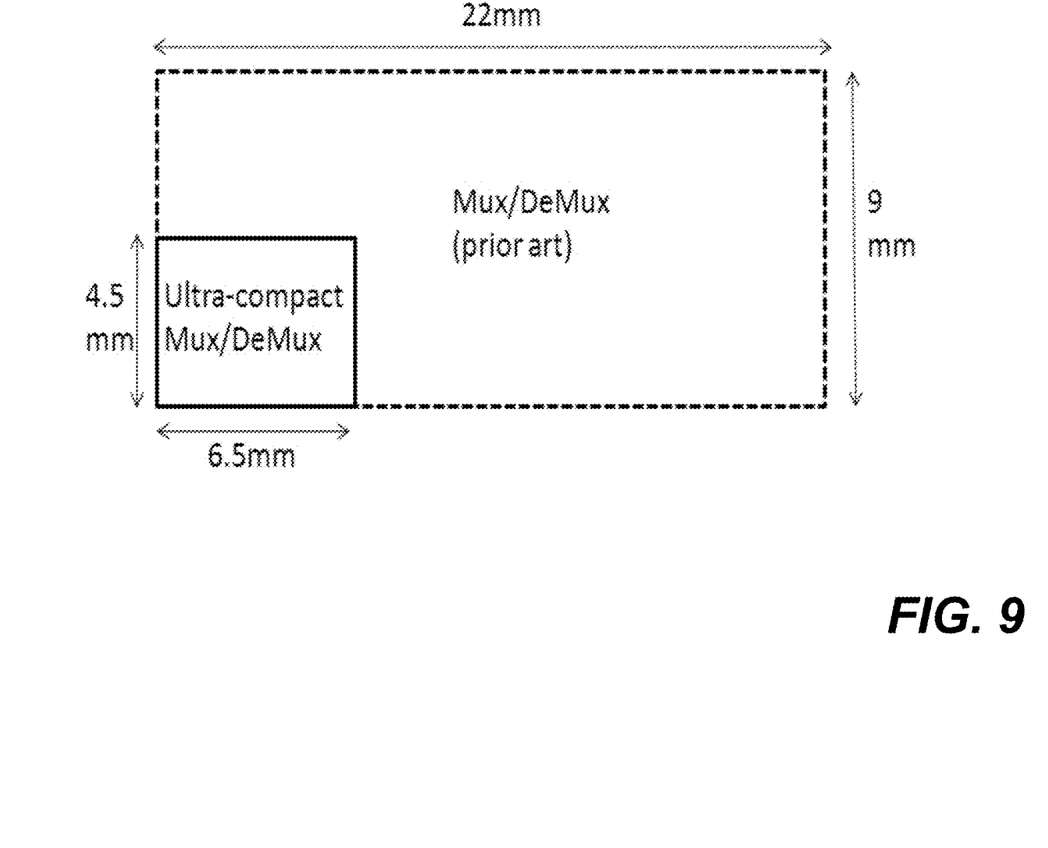
FIG. 9 illustrates graphically the estimated footprints of two designs.

FIG. 8 shows a perspective view of an exemplary assembly 800 with some compensative plate and fixation aid devices. Two wedges are used to fix the position of the collimating lens. With this design, the size of multi-port Mux/DeMux can be greatly reduced. A typical dimensions of a 4-port ultra-compact Mux/DeMux device can be 6.5 mm (L)×4.5 mm (W)×2.6 mm (H) while 22 mm (L)×9 mm (W)×4 mm (H) for the same device in the prior are design. As a result, the new design achieves 85% substrate footprint reduction. FIG. 9 illustrates graphically the footprints of the two designs.

In summary, the present invention discloses new designs of Mux/DeMux assembly. With a typically 85% size reduction compared to the prior art design, for example FIG. 1, the Mux/DeMux assembly can fit into a QSFP module. The invention also provides solution to tune the optical performance by compensating focused beam misalignment due to the dimension and position errors.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical assembly comprising:
a collimator;
a glass block coated with a first coating and a second coating on one side thereof adjacent to the collimator;
an array of filters on an opposite side of the glass block, each of the filters passing through one specified wavelength;
an array of micro-lenses arranged near the filters; and
a substrate on which the collimator, glass block and micro-lenses are bonded, where the glass block is tilted with respect to the collimator and the array of micro-lenses to ensure that each of the micro-lenses corresponds to one of the filters.

2. The optical assembly of claim 1 further comprising at least one compensative plate inserted between the array of micro-lenses and the array of filters to correct optical errors caused by one or more of the collimator, the filters, the glass block and the micro-lenses.

3. The optical assembly of claim 2, wherein the compensative plate is made to correct rotational errors by keeping the compensative plate slanted with respect to the array of micro-lenses.

4. The optical assembly of claim 1, wherein the collimator couples a light beam containing a number of wavelengths to the first coating, the first coating is anti-reflective and passes the light beam that hits a first filter of the array of filters, wherein the first filter passes a signal with a specified wavelength and reflects a signal containing all other wavelengths.

5. The optical assembly of claim 4, wherein the reflected signal containing all other wavelengths travelling in the glass block is reflected by the second coating, the second coating is high-reflective coating that directs the reflected signal to a second filter of the array of filters, where the second filter passes a signal with a specified wavelength and reflects a signal containing all other wavelengths.

6. The optical assembly of claim 5, wherein transmitted signals from at least the first and second filters are respectively coupled by corresponding lenses to corresponding receivers outside the optical assembly.

7. The optical assembly of claim 6, further comprising a compensative plate inserted between the array of micro-lenses and the array of filters to correct angular errors of one or more of the transmitted signals.

8. The optical assembly of claim 1, wherein the collimator and glass block are bonded to the substrate using one or more wedges to hold up respective positions thereof.

9. The optical assembly of claim 1, wherein the optical assembly fits in a Quad Small Form-factor Pluggable (QSFP) optical module.

10. An optical assembly comprising:
a collimator;
a glass block coated with a first coating and a second coating on one side thereof adjacent to the collimator;
an array of filters affixed to an opposite side of the glass block, each of the filters passing through one specified wavelength;
an array of micro-lenses arranged near the filters;
at least one compensative plate inserted between the array of filters and the array of micro-lenses to correct optical errors introduced by one or more of the collimator, the glass block, the filters and the micro-lenses; and a substrate on which the collimator, glass block and micro-lenses are bonded, where the glass block is tilted with respect to the collimator and the array of micro-lenses to ensure that each of the micro-lenses corresponds to one of the filters.

11. The optical assembly of claim 10, wherein the compensative plate is made to correct rotational errors by keeping the compensative plate slanted with respect to the array of micro-lenses.

12. The optical assembly of claim 10, wherein the collimator couples a light beam containing a number of wavelengths to the first coating, the first coating is anti-reflective and passes the light beam that hits a first filter of the array of filters, wherein the first filter passes a signal with a first wavelength and reflects a signal containing all wavelengths except the first wavelength.

13. The optical assembly of claim 12, wherein the reflected signal containing all wavelengths, except the first wavelength, traveling in the glass block is reflected by the second coating being high-reflective coating that directs the reflected signal to a second filter of the array of filters, wherein the second filter passes a signal with a second wavelength and reflects a signal containing all wavelengths except the first and second wavelengths.

14. The optical assembly of claim 13, wherein transmitted signals from at least the first and second filters are respectively coupled by corresponding lenses to corresponding receivers outside the optical assembly.

15. The optical assembly of claim 10, wherein the collimator, glass block and micro-lenses are bonded to the substrate using one or more wedges to hold up respective positions thereof.

16. The optical assembly of claim 10, wherein the optical assembly fits in a Quad Small Form-factor Pluggable (QSFP) optical module.

* * * * *